(12) United States Patent
Sakai et al.

(10) Patent No.: US 9,292,241 B2
(45) Date of Patent: Mar. 22, 2016

(54) PRINTING APPARATUS AND PRINTING SYSTEM

(71) Applicant: SEIKO EPSON CORPORATION, Tokyo (JP)

(72) Inventors: Hiroaki Sakai, Nagano (JP); Koichi Otsuki, Nagano (JP); Hideki Kato, Nagano (JP); Shinya Momose, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 14/023,918

(22) Filed: Sep. 11, 2013

(65) Prior Publication Data

US 2014/0078222 A1 Mar. 20, 2014

(30) Foreign Application Priority Data

Sep. 14, 2012 (JP) ................................. 2012-202381

(51) Int. Cl.
*B41J 2/04* (2006.01)
*B41J 1/16* (2006.01)
*G06F 3/12* (2006.01)
(Continued)

(52) U.S. Cl.
CPC ................. *G06F 3/1236* (2013.01); *B41J 2/01* (2013.01); *B41J 3/36* (2013.01); *B41J 29/38* (2013.01)

(58) Field of Classification Search
CPC ......... G06F 3/125; G06F 3/14; G06F 3/1407; G06F 3/147; G06F 5/01; H04N 1/193; H04N 1/08; H04N 1/0821; H04N 1/0852; H04N 1/0882; H04N 1/00761; B41J 11/005; B41J 11/0085; B41J 11/007; B41J 11/0055; B41J 11/0025; B41J 13/226; B65H 23/028; B65H 23/032; B65H 23/0032; B65H 23/26; B65H 23/28; B65H 23/18

USPC ............................................ 347/6, 14, 20, 57
See application file for complete search history.

(56) References Cited

U.S. PATENT DOCUMENTS 4,207,365 A * 6/1980 Hamisch, Jr. ................. 428/40.1
5,602,650 A * 2/1997 Tamura .................. G06F 1/1616
358/400

(Continued)

FOREIGN PATENT DOCUMENTS

JP 08-295096 A 11/1996
JP 08-298568 A 11/1996

(Continued)

*Primary Examiner* — Matthew Luu
*Assistant Examiner* — Patrick King
(74) *Attorney, Agent, or Firm* — Global IP Counselors, LLP (57) ABSTRACT

To provide a printing apparatus where printing is possible by easily and rapidly acquiring a desired image, a multi-functional tablet device is provided with an imaging section which acquires an image, a display section which displays the image, an designating section for designating using a fingertip with regard to the displayed image, a printing section which prints an imaging image on a medium, and a control section which creates the imaging image, which is based on the image, based on designation from the designating section and which prints the created imaging image in the printing section, where the control section determines the printing range with regard to the image which is captured by the imaging section based on the designation from the designating section, creates the imaging image by editing the image in the printing range, and determines a printing position where the imaging image is printed on the medium.

6 Claims, 10 Drawing Sheets

(51) Int. Cl.
  *B41J 2/01* (2006.01)
  *B41J 3/36* (2006.01)
  *B41J 29/38* (2006.01)

(56) References Cited

U.S. PATENT DOCUMENTS

| | | | |
|---|---|---|---|
| 5,861,877 A | 1/1999 | Kagayama et al. | |
| 5,896,471 A | 4/1999 | Suzuki et al. | |
| 5,927,872 A | 7/1999 | Yamada | |
| 6,609,844 B1 * | 8/2003 | Petteruti et al. | 400/88 |
| 6,652,170 B1 * | 11/2003 | Arnold | 400/88 |
| 6,796,500 B1 * | 9/2004 | Chen | 235/439 |
| 6,963,359 B1 * | 11/2005 | Aosaki | G03B 17/52 348/207.2 |
| 6,995,876 B2 * | 2/2006 | Silverbrook | 358/473 |
| 7,054,148 B2 * | 5/2006 | Chen et al. | 361/679.4 |
| 7,287,850 B2 * | 10/2007 | Matsui et al. | 347/109 |
| 7,681,981 B2 * | 3/2010 | Hoshi | 347/22 |
| 8,208,164 B2 * | 6/2012 | Yada et al. | 358/1.15 |
| 8,243,318 B2 * | 8/2012 | Edwards | H04N 1/00411 358/1.1 |
| 8,382,295 B1 * | 2/2013 | Kim et al. | 353/119 |
| 2001/0008582 A1 * | 7/2001 | Sato | G02F 1/133348 396/429 |
| 2004/0047003 A1 * | 3/2004 | Silverbrook | B41J 2/01 358/473 |
| 2004/0066447 A1 * | 4/2004 | Arnold | 347/109 |
| 2007/0025600 A1 * | 2/2007 | Ghebreyesus | 382/124 |
| 2008/0080010 A1 * | 4/2008 | Korst | H04N 1/00347 358/401 |
| 2009/0021797 A1 * | 1/2009 | Luciano | H04N 1/00238 358/474 |
| 2009/0251739 A1 * | 10/2009 | Cook | H04N 1/10 358/474 |
| 2010/0118327 A1 * | 5/2010 | Caspar | H04N 1/00241 358/1.13 |
| 2011/0307842 A1 * | 12/2011 | Chiang et al. | 715/863 |
| 2012/0120430 A1 * | 5/2012 | Tsai | 358/1.13 |
| 2012/0242685 A1 * | 9/2012 | Ohtake | 345/619 |

FOREIGN PATENT DOCUMENTS

| | | |
|---|---|---|
| JP | 11-058844 A | 3/1999 |
| JP | 2003-080765 A | 3/2003 |
| JP | 4351067 B2 | 10/2009 |
| JP | 2012-160841 A | 8/2012 |
| WO | 03/069453 A1 | 8/2003 |

* cited by examiner

PRINTING APPARATUS AND PRINTING SYSTEM

CROSS-REFERENCE TO RELATED APPLICATIONS

This application claims priority to Japanese Patent Application No. 2012-202381 filed on Sep. 14, 2012. The entire disclosure of Japanese Patent Application No. 2012-202381 is hereby incorporated herein by reference.

BACKGROUND

1. Technical Field

The present invention relates to a printing apparatus and a printing system.

2. Background Technology

The configuration of a well-known printer with a liquid crystal panel is configured from a printer section which has an image forming section on a bottom section as shown in Patent Document 1 described below and an input section has a configuration where positions and text are input using a button operation at a right side of an input section. In addition, Patent Document 2 discloses a technique where reading an image or outputting an image is performed using an input and output pen as a so called multi-functional device. In addition, Patent Document 3 discloses an apparatus which outputs data which is read using a mouse pen. In addition, Patent Document 4 discloses an apparatus where printing is performed using a home PC.

Japanese Laid-open Patent Publication No. 2003-80765 (Patent Document 1), Japanese Laid-open Patent Publication No. H8-298568 (Patent Document 2), Japanese Laid-open Patent Publication No. H11-58844 (Patent Document 3), and Japanese Patent Registration No. 4351067 (Patent Document 4) are examples of the related art.

SUMMARY

Problem to be Solved by the Invention

However, well-known multi-functional devices are large and heavy and it is not possible for a user to grasp with one hand. In addition, in printing of data in a smartphone or a digital camera with printers or multi-functional devices, even when it is possible to send printing information to a printer via a PC or the like or to connect directly to a printer, it is necessary to perform dedicated settings and operation of the printer body in order to perform printing. Furthermore, a dedicated bag or shoulder bag is also necessary for transporting for use when out. In addition, a table or desk is necessary when reading and printing.

Means for Solving Problem

The invention is made to solve at least some of the problems described above and is able to be realized using the embodiments and applied examples described below.

Applied Example 1

A printing apparatus according to the present applied example is provided with an image acquiring section which acquires an image, a display section which displays the image, a designating section for designating with regard to the image which is displayed on the display section, a printing section which prints an imaging image on a medium, and a control section which creates the imaging image, which is based on the image, based on designation from the designating section and which prints the created imaging image in the printing section, where the control section determines the printing range with regard to the image which is acquired by the image acquiring section based on the designation from the designating section, creates the imaging image by editing the image in the printing range, and determines a printing position where the imaging image is printed on the medium.

According to such a configuration, an image is created by specifying the printing range and editing with regard to the acquired image, the printing position where the imaging image is printed on the medium is determined, and the imaging image is printed on the medium by the printing section. Accordingly, it is possible for the printing apparatus to print by easily and rapidly acquiring a desired image since it is possible to execute a series of processes up until an image is acquired and printed without relying on another apparatus.

Applied Example 2

In the printing apparatus according to the applied example described above, the control section can create the imaging image by carrying out at least one imaging process of enlargement, reduction, rotation, and inversion with regard to the image.

Applied Example 3

In the printing apparatus according to the applied example described above, the control section can divide the imaging image into a plurality of regions, move the location where the printing section prints to fit the regions, and designate printing to each region in a case of printing the imaging image which is wider than a printable region of the printing section.

Applied Example 4

In the printing apparatus according to the applied example described above, the display section can have a transmissive display body where the display surface is transmissive and at least one of the printing range and the printing position can be determined by the display body being designated by the designating section.

Applied Example 5

In the printing apparatus according to the applied example described above, a printing section can be provided with a printing head and a sub tank which supplies ink to the printing head, and the printing head can reciprocate in a main scanning direction while discharging ink droplets onto an opposing medium and can move in a sub-scanning direction which intersects with the main scanning direction.

Applied Example 6

In the printing apparatus according to the applied example described above, an image reading section, which reads an opposing image by moving an image sensor along the main scanning direction in the sub-scanning direction, can be provided so as to be able to be attached and detached.

Applied Example 7

A printing system according to the present applied example can be provided with a docking apparatus which combines with the printing apparatus and supplies ink and electric power to the printing apparatus.

According to such a configuration, an imaging image is created by specifying a printing range and editing with regard to the acquired image, the printing position where the imaging image is printed on the medium is determined, and the imaging image is printed on the medium by the printing section. Accordingly, it is possible for the printing apparatus to print by easily and rapidly acquiring a desired image since it is possible to execute a series of processes up until an image is acquired and printed without relying on another apparatus, and further, to supply ink and electric power from the docking apparatus.

BRIEF DESCRIPTION OF THE DRAWINGS

Referring now to the attached drawings which form a part of this original disclosure.

DETAILED DESCRIPTION OF EXEMPLARY EMBODIMENTS

Below, embodiments of the invention will be described with reference to the drawings.
(Embodiment 1)

Figure 1:
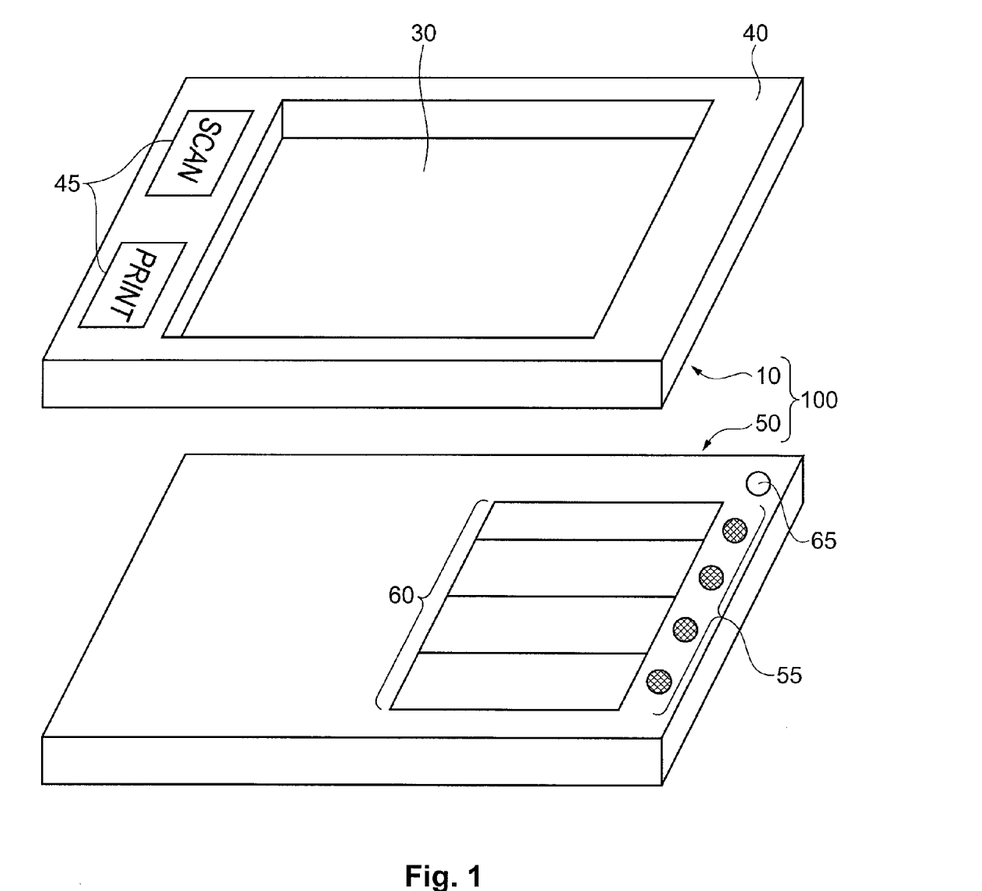
FIG. 1 is a diagram illustrating an outer appearance of a multi-functional tablet device according to a first embodiment of the invention.

FIG. 1 illustrates an outer appearance of a multi-functional tablet device 10 which is a printing apparatus. The multi-functional tablet device 10 is provided with the function of reading a document image of paperwork or the like based on an operation by a user and printing an image on the medium in a range of printing which the user specifies from the document image. A casing 40 for the multi-functional tablet device 10 has a plate shape and a touch panel display 30 is assembled in substantially the central section of the casing 40. The touch panel display 30 functions as a display section which displays an image and a designating section where designating is carried out by a fingertip coming into contact with the image which is displayed. In embodiment 1, the touch panel display 30 adopts a transmissive display body through which a display surface is transmitted. In addition, an operation button 45 for operating the multi-functional tablet device 10 is arranged on one surface (front surface) of the casing 40. The multi-functional tablet device 10 is assumed to have a weight which a user is able to hold with one hand with a planar section with an approximate A5 to A4 size.

In addition, a docking apparatus 50 which supplies printer ink and electric power with regard to the multi-functional tablet device 10 is configured for a printing system 100 along with the multi-functional tablet device 10. A front surface of the docking apparatus 50 is configured so as to be able to be combined with the other surface (a rear surface) of the multi-functional tablet device 10. That is, an electric power supply section 65 which supplies power while not coming into contact with the multi-functional tablet device 10 and an ink supply section 55, which supplies ink of each color which is stored in an ink tank 60 to the multi-functional tablet device 10, are provided on the front surface of the docking apparatus 50.

Figure 2:
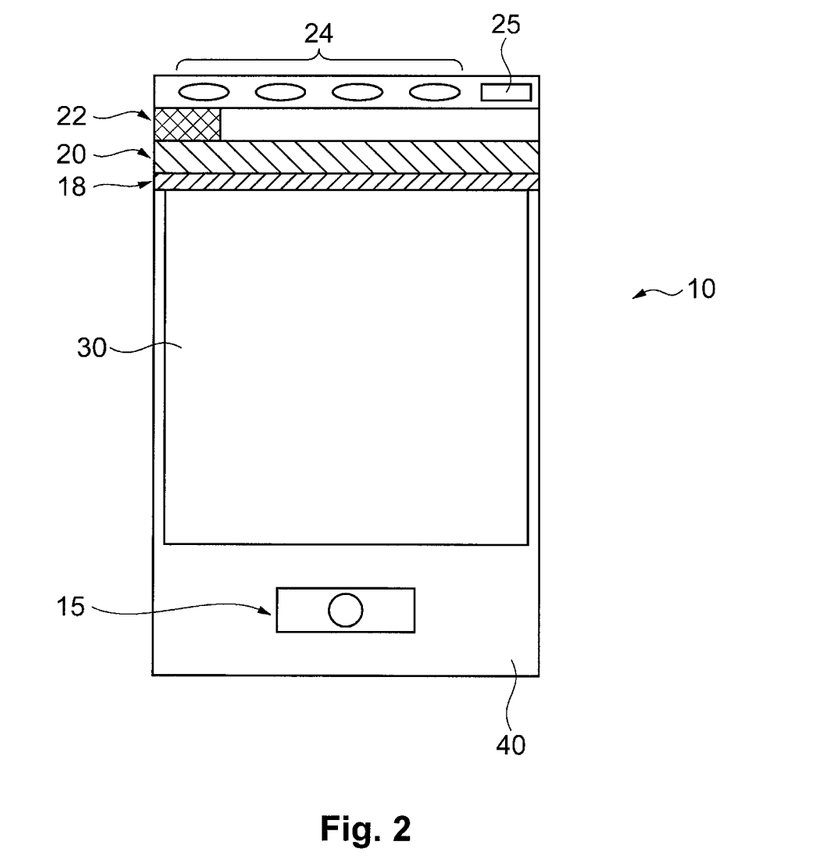
FIG. 2 is a diagram of an outer appearance of a multi-functional tablet device when viewed from a rear surface according to the first embodiment of the invention.

FIG. 2 is a diagram of an outer appearance of the multi-functional tablet device 10 when viewed from the other surface (the rear surface). An ink acquiring area 24, an electric power acquiring antenna 25, a printing head 22, an image sensor 20, an LED light 18, and a camera 15 are provided on the rear surface of the multi-functional tablet device 10. The ink acquiring area 24 and the electric power acquiring antenna 25 respectively oppose the ink supply section 55 and the electric power supply section 65 in a case of being combined with the multi-functional tablet device 10. In this state, the ink is supplied to the ink acquiring area 24, the ink which is supplied is stored in a sub-tank (which is omitted from the diagrams) and is provided to the printing head 22. In addition, the electric power which is supplied to the electric power acquiring antenna 25 is provided to a secondary battery (which is omitted from the diagrams) of the multi-functional tablet device 10. The printing head 22 adopts an ink jet method, and an image is formed on a medium by reciprocating in a direction (a main scanning direction) on the rear surface of the multi-functional tablet device 10 while discharging ink droplets onto an opposing medium and moving in a longitudinal direction of the multi-functional tablet device 10 (a sub-scanning direction) which intersects with the main scanning direction.

The image scanner 20 moves in the sub-scanning direction and functions as a scanner. In embodiment 1, the image scanner 20 is formed to be able to be removed with regard to the multi-functional tablet device 10. Here, a mechanism which moves the printing head 22 and the image sensor 20 in the sub-scanning direction can move the printing head 22 and the image sensor 20 with the same motor at the same time, but a plurality of motors can be used or the printing head 22 and the image sensor 20 can be moved individually by switching one motor. In a case where the image scanner 20 is used, the user attaches a scanner panel to the back surface and fixes on an image or wording which is desired to be read. At this time, since the image darkens, it is possible for the user to turn on the LED light 18. In addition, it is possible to use the LED light 18 even in a case where there is a desire for data which is read to be processed using an OCR function which is mounted. In addition, a case cover for screen protection which is not shown in the diagram can be used in a case where the user senses glare from the light of the LED light 18 during scanning.

Figure 3:
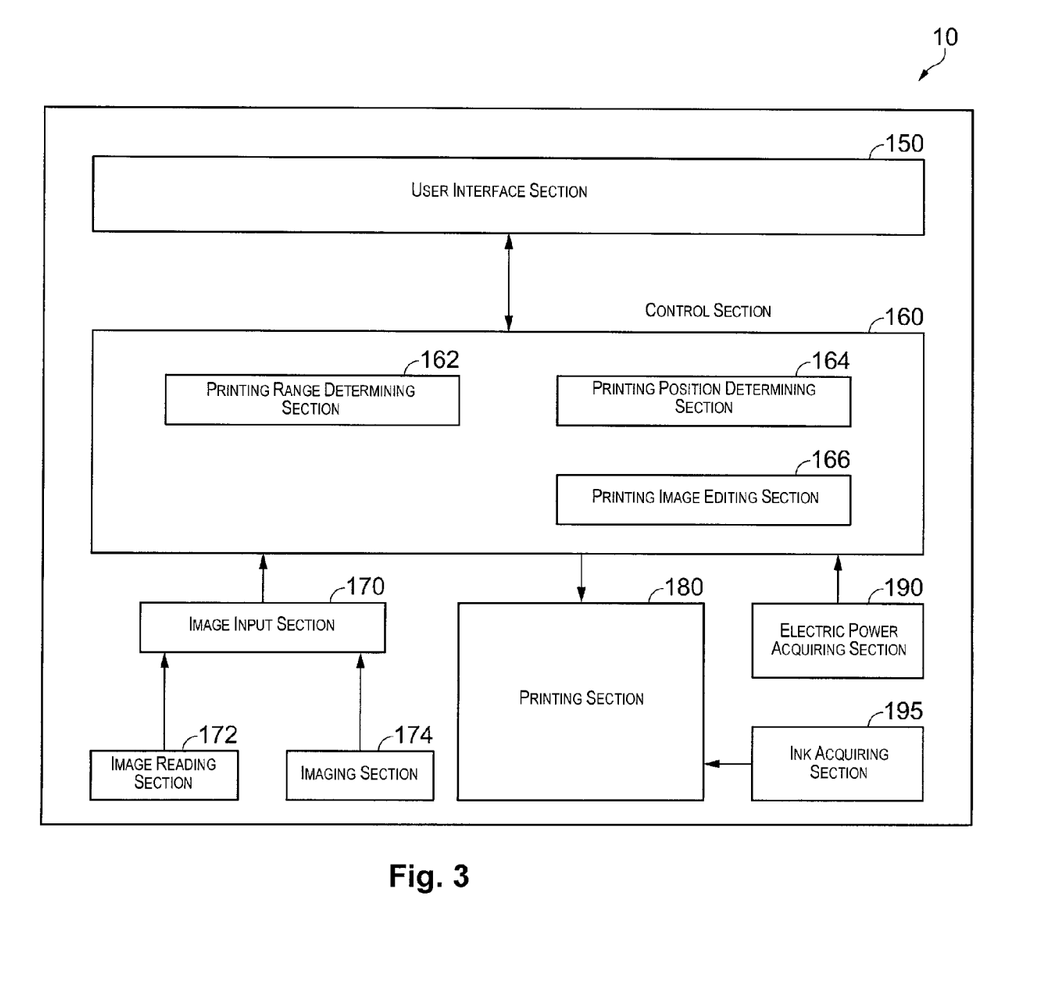
FIG. 3 is a block diagram illustrating a functional configuration of a multi-functional tablet device according to the first embodiment of the invention.

The camera 15 is assumed to be a digital camera which uses a CCD or the like and outputs an image which is captured in a prescribed data format. FIG. 3 is a block diagram illustrating a functional configuration of the multi-functional tablet device 10. The multi-functional tablet device 10 is provided with a user interface section 150, a control section 160, an image input section 170, an image reading section 172, an imaging section 174, a printing section 180, an electric power acquiring section 190, and an ink acquiring section 195. In addition, the control section 160 is provided with a printing range determining section 162, a printing position determining section 164, and a printing image editing section 166, creates an imaging image based on an image which is based on designation from the user interface section 150, and the imaging image which is created is printed by the printing section 180. The control section 160 is provided with a CPU, a RAM, a ROM, a storage device, and the like as hardware none of which are shown in the diagrams, and the functions of the control section are realized by the cooperation with software which is stored in the ROM and the storage device.

The operation button 45 and the touch panel display 30 are assumed for the user interface section 150. Here, although omitted in the diagrams, it is possible to also assume a stylus pen as an input means for the user. In addition, the image sensor 20 is assumed for the image reading section 172 and the camera 15 is assumed for the imaging section 174. The image reading section 172 and the imaging section function as an image acquiring section which acquires an image. Data on an image which is read by the image reading section 172, an image which is captured by the imaging section 174, or an image which is drawn using a stylus pen is input in the image input section 170. The image which is input into the image input section 170 is displayed on the touch panel display 30 based on designation by the control section 160. In addition, the printing head 22 is assumed for the printing section 180, and the electric power acquiring antenna 25 and the ink acquiring area 24 are respectively assumed for the electric power acquiring section 190 and the ink acquiring section 195. The printing range determining section 162 displays the image which is input into the image input section 170 on the touch panel display 30 and determines a region of the image to be printed by the user designating the region on the touch panel display 30.

The printing position determining section 164 displays the region of the image to be printed, which is determined by the printing range determining section 162, on the touch display panel 30 and a position to be printed is determined by the user designating by moving a fingertip. Here, since the touch display panel 30 is transmissive, it is possible for the user to determine the printing position in a state where the image to be printed is overlapped with paper. The printing image editing section 166 generates an imaging image by carrying out image processing such as rotation, enlargement, reduction, and inversion with regard to the image to be printed which is determined by the printing range determining section 162 based on the designation from the user. In addition, since an OCR function is also provided, it is possible to edit by extracting wording in a case where wording is included in the image. Due to the above configuration, the user brings the multi-functional tablet device 10 into close proximity above a document such as paperwork which is able to be visually recognized through the touch panel display 30 while grasping the casing 40 and an image which is desired to be read is captured by the camera 15. At this time, it is possible for range specification of an outline of an image which is desired to be positioned or read to be simply performed since operations are possible while viewing the actual screen which is transmissive.

The user captures the image by performing horizontal leveling so that edge surfaces of the image are able to be seen. In detail, a range is determined and imaged by being fixed so that margins are exposed on both edge sides of the paper of the document. The control section 160 is provided with a gyro sensor (which is omitted from the diagrams) as hardware and distortion correction is performed automatically using the gyro sensor with regard to correction of camera shaking and distortion in the Z axis. In addition, in a case where an image is read with a scanning function using the image sensor 20, the user places the multi-functional tablet device 10 over the document to be read and the image is read by the image sensor 20 starting scanning due to the operation button 45 being pressed.

The image which is captured by the camera 15 or the image which is read by the image sensor 20 is displayed on the touch panel display 30. Next, it is possible for detailed range specification (trimming) to be performed for output by the user carrying out correction processing with regard to the image which is displayed on the touch panel display 30. For example, it is possible to perform numerical settings using content which is displayed on a data capacity screen and is desired to be output when enlarging or reducing. Next, the user places the multi-functional tablet device 10 over a medium such as paper which is to be printed on. It is possible for the user to move the image which is displayed on the touch panel display 30 by touching with a fingertip. In this case, it is possible for the printing position of the image to be determined visually since it is possible for the user to visually recognize the paper through the image sensor 20.

The user designates printing by pressing the operation button 45 after the printing position of the image is determined. As a result, the imaging image which is created by the printing image editing section 166 is printed at the printing position on the paper based on the determination by the printing position determining section 164. In addition, in a case where a stylus pen is used, it is possible to input text with the feel of handwriting while viewing the image which is output as the background. It is possible to print the writing as it is without performing positioning. Color specification can be determined by a color mode setting on a pen section. It is possible to perform input of handwriting using the OCR function in a case where typing is desired. In addition, in a case of printing a printing image which is wider than the region which is printed by the printing section 180, it is possible to print by dividing up the printing region by the user moving the multi-functional tablet device 10 based on the designation by the multi-functional tablet device 10.

According to embodiment 1 described above, it is possible to carry the multi-functional tablet device 10 by inserting into a pocket or a pouch since the multi-functional tablet device 10 is light weight and compact, and it is possible to use with a feel of taking notes anytime and anywhere without restrictions on time or place since printing is possible by acquiring an image with a simple operation. In addition, it is possible to easily use the multi-functional tablet device 10 even for people without an information terminal since operations are possible without using another information terminal. In addition, the multi-functional tablet device 10 does not require a large capacity memory since it is not necessary to store data.

(Embodiment 2)

Figure 4:
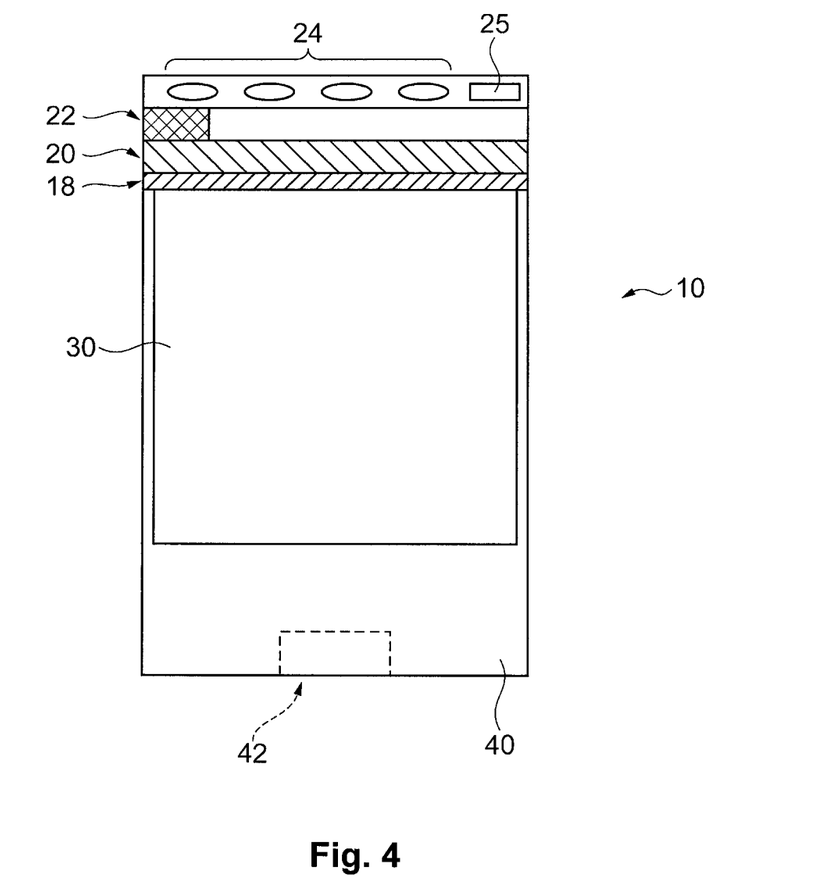
FIG. 4 is a diagram illustrating an outer appearance of a multi-functional tablet device according to a second embodiment of the invention.

Next, embodiment 2 of the invention will be described by referencing FIG. 4. Here, in the following description, the same reference numerals are applied to the same portions as the portions which have already been described and the description thereof is omitted. FIG. 4 is a diagram of an outer appearance of the multi-functional tablet device 10 when viewed from the rear surface. The camera 15 is provided in the multi-functional tablet device 10 in embodiment 1, but an image data input terminal 42 for acquiring data on an image which is captured by a digital camera, a smart phone, or the like is provided in embodiment 2 instead of the camera 15. The image data input terminal 42 can be a terminal which corresponds to a specific parallel bus or serial bus. In embodiment 2, it is possible to acquire image data from an external device in addition to the effects of embodiment 1.

(Embodiment 3)

Figure 5:
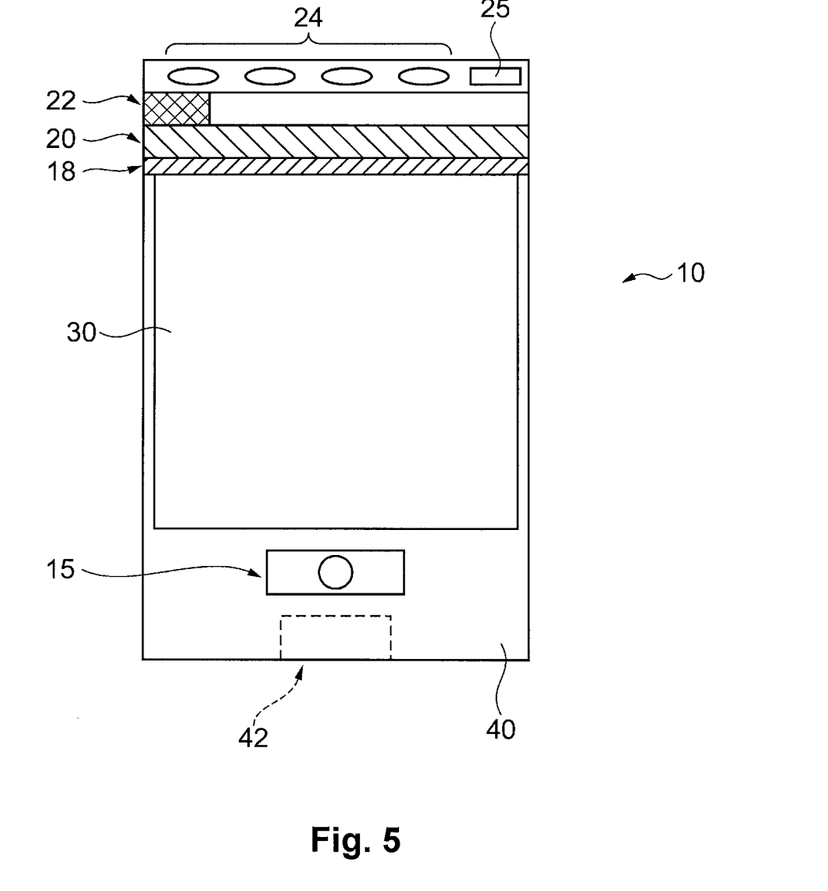
FIG. 5 is a diagram illustrating an outer appearance of a multi-functional tablet device according to a third embodiment of the invention.

Next, embodiment 3 of the invention will be described by referencing FIG. 5. FIG. 5 is a diagram of an outer appearance of the multi-functional tablet device 10 when viewed from the rear surface. In embodiment 3, the image data input terminal 42 is provided in embodiment 1. In embodiment 3, it is possible to realize the same effects as in embodiment 2.

(Embodiment 4)

Figure 6:
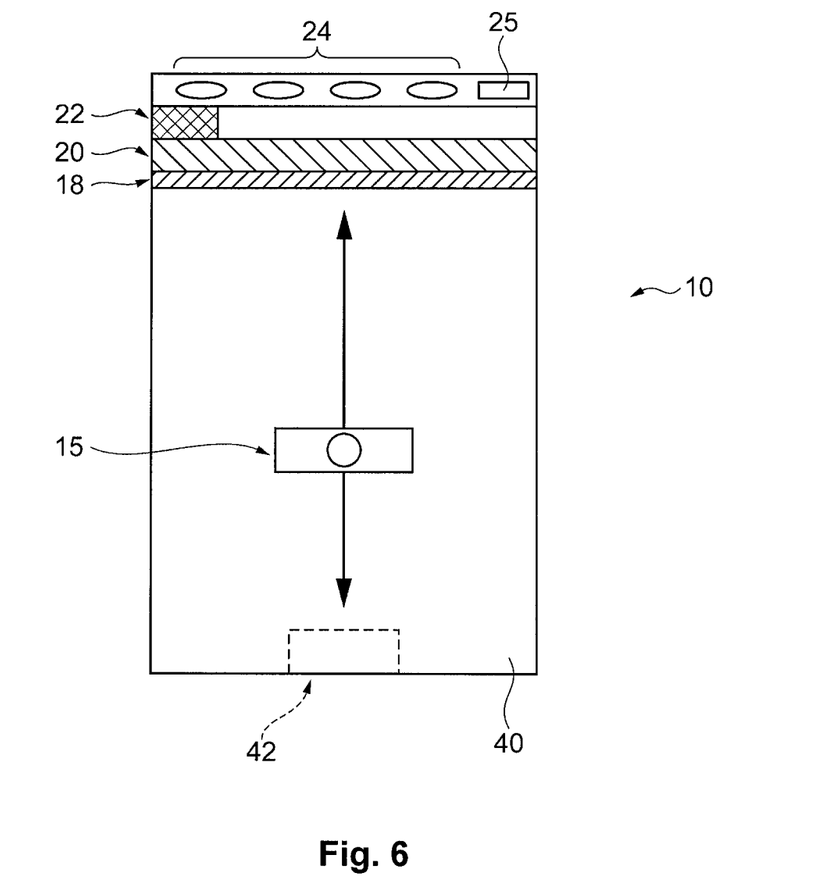
FIG. 6 is a diagram illustrating an outer appearance of a multi-functional tablet device according to a fourth embodiment of the invention.

Next, embodiment 4 of the invention will be described by referencing FIG. 6. FIG. 6 is a diagram of an outer appearance of the multi-functional tablet device 10 when viewed from the rear surface. The touch panel display 30 adopts a transmissive format in embodiment 1 but a non-transmissive format is adopted in embodiment 4. In addition, it is possible for the user to move the position of the camera 15 in the horizontal direction in addition to the vertical direction and it is possible for the camera 15 to be fixed in an arbitrary position. In embodiment 4, it is possible to set an arbitrary capturing angle by changing the position of the camera 15 in addition to the effect of embodiment 2.

(Embodiment 5)

Figure 7:
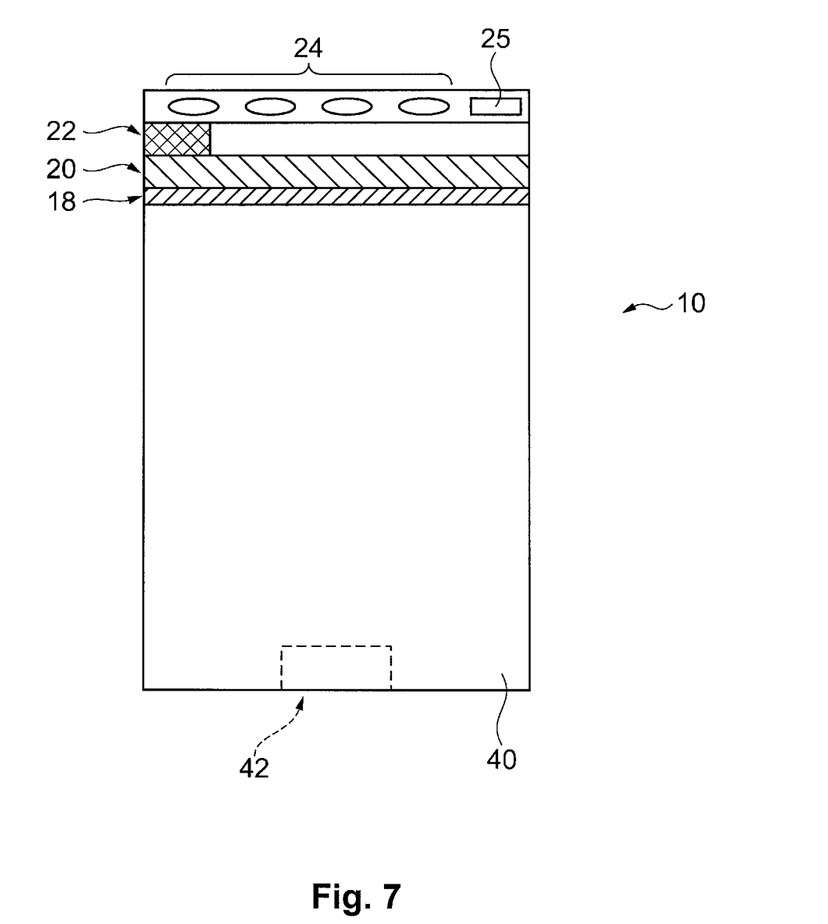
FIG. 7 is a diagram illustrating an outer appearance of a multi-functional tablet device according to a fifth embodiment of the invention.

Next, embodiment 5 of the invention will be described by referencing FIG. 7. FIG. 7 is a diagram of an outer appearance of the multi-functional tablet device 10 when viewed from the rear surface. In embodiment 5, the touch panel display 30 adopts a non-transmissive format and is further provided with the image data input terminal 42 for acquiring data on an image which is captured by a digital camera, a smart phone, or the like. In embodiment 5, it is possible to realize the same effects as in embodiment 2.

(Embodiment 6)

Figure 8:
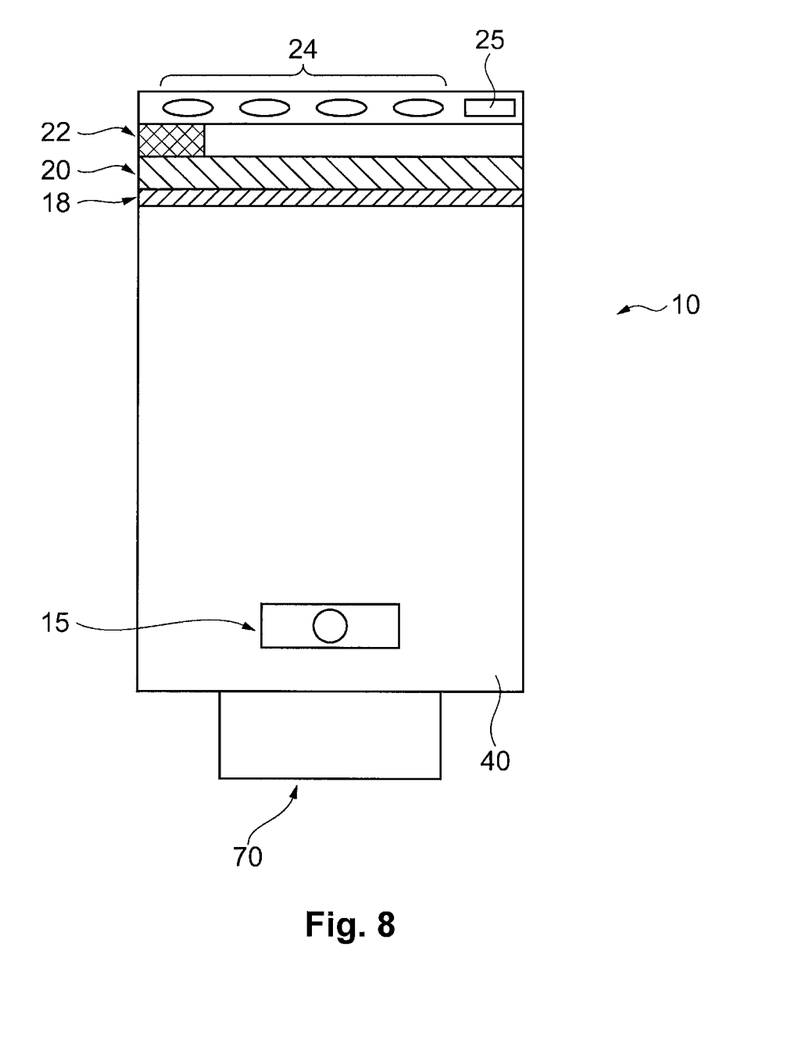
FIG. 8 is a diagram illustrating an outer appearance of a multi-functional tablet device according to a sixth embodiment of the invention.

Next, embodiment 6 of the invention will be described by referencing FIG. 8. FIG. 8 is a diagram of an outer appearance of the multi-functional tablet device 10 when viewed from the rear surface. An image data input apparatus 70 for acquiring data on an image which is captured by a digital camera, a smart phone, or the like is provided in embodiment 6. A communication apparatus, which performs communication based on a short-distance wireless communication standard such as Bluetooth (registered trademark) and performs communication based on a standard such as TCP/IP protocol, is assumed for the image data input apparatus 70. In addition, the image data input apparatus 70 can be a card reader apparatus which reads image data which is stored on a flash memory or the like. In addition, the image data is not limited to stationary image data and can be moving image data.

In addition, it is possible to assume a format where the image sensor 20 is not provided. Here, the image data input apparatus 70 is not limited to a format of being able to be attached and detached and it is possible to assume a format where the image data input apparatus 70 is built into the multi-functional tablet device 10. In embodiment 6, it is possible to acquire external image data via communication or a memory card in addition to the effects of embodiment 2.

(Embodiment 7)

Figure 9:
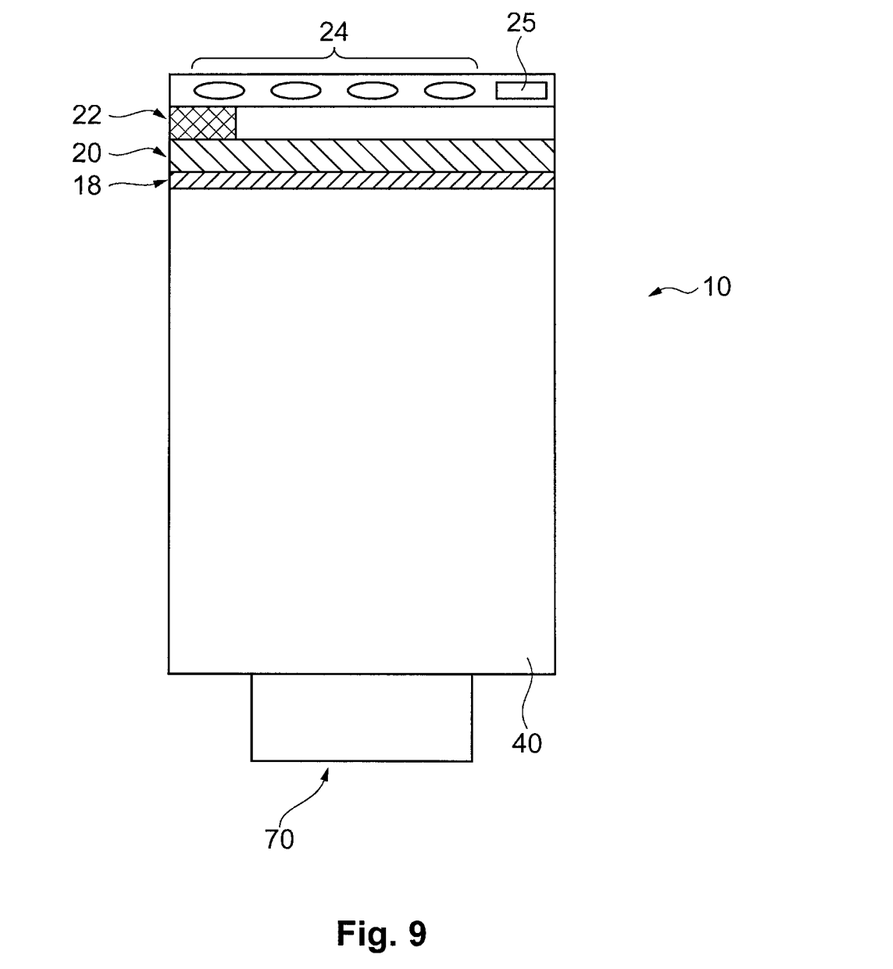
FIG. 9 is a diagram illustrating an outer appearance of a multi-functional tablet device according to a seventh embodiment of the invention.

Next, embodiment 7 of the invention will be described by referencing FIG. 9. FIG. 9 is a diagram of an outer appearance of the multi-functional tablet 10 device when viewed from the rear surface. Embodiment 7 is a format where the camera 15 is excluded from embodiment 6. In embodiment 7, it is possible to realize the same effects as in embodiment 6.

(Embodiment 8)

Figure 10:
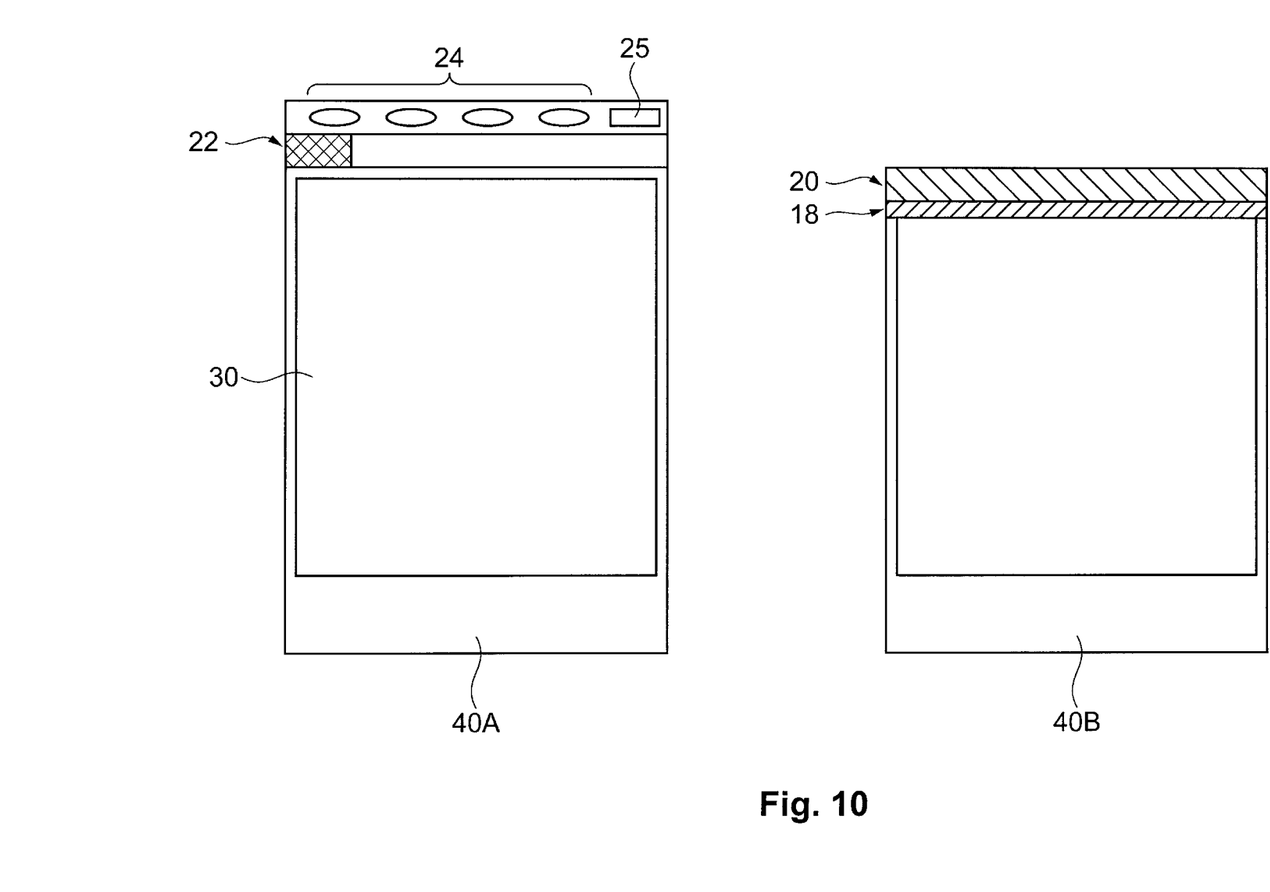
FIG. 10 is a diagram of an outer appearance of the multi-functional tablet device which is divided when viewed from a rear surface according to an eighth embodiment of the invention.

Next, embodiment 8 of the invention will be described by referencing FIG. 10. FIG. 10 is a diagram of an outer appearance of the multi-functional tablet device 10 which is divided into two with each viewed from the rear surface. A format is shown in embodiment 8 where a scanner function section which includes the image sensor 20 and the LED light 18 is split. In embodiment 8, it is possible to split the casing 40 into a first casing section 40A and a second casing section 40B and the scanner function section is assembled in the second casing section 40B. In embodiment 8, since there is a configuration where the second casing section 40B is a configuration where the second casing section 40B is also used as a fixing and setting (pressing) tool, improvements in image quality are achieved by the paper being pressed by the second casing section 40B as a paper press when printing in addition to the effects of embodiment 1.

The embodiments of the invention are described by referencing the diagrams, but the detail configuration is not limited to the embodiments and design modifications and the like are possible in the scope which does not depart from the gist of the invention. For example, a transmissive organic EL panel can be adopted as the display body of the touch panel display 30. In this case, an organic EL panel is assumed where an R region, a G region, and a B region are formed as light emitting elements and one other region is formed as a position sensor. As a result, the organic EL panel also provides a function as a position sensor in addition to the original display function. Due to this, it is possible to apply one of the organic EL panels as a touch panel which is used as both a display apparatus and a position input apparatus.

There are cases where the apparatus which executes the technique as above is realized using a single apparatus and cases where the apparatus which executes the technique as above is realized by assembling a plurality of apparatuses, and various formats are included. Each configuration of each of the embodiments and combinations of these configurations are one example and additions, omissions, replacements, and other modifications of configurations are possible in the scope which does not depart from the gist of the invention. In addition, the invention is not limited to the embodiments and is only limited by the scope of the claims.

What is claimed is:

1. A printing system comprising:
   a printing apparatus; and
   a docking apparatus which combines with the printing apparatus and supplies ink and electric power to the printing apparatus,
   the printing apparatus including
   a casing,
   an image acquiring section which acquires an image,
   a designating section configured to designate printing with regard to the image;
   a printing section which includes a printing head and forms an image on the medium based on an imaging image by exposing the printing head from the casing,
   a transmissive section configured such that a region of the medium corresponding to a printing range is transmitted through the transmissive section so as to allow a user to visually recognize the medium, and a control section which includes a CPU and creates the imaging image, which is based on the image, based on designation from the designating section and which prints the created imaging image in the printing section, printing being carried out with the printing head while the user places the printing apparatus over the medium and a surface of the casing where the printing head is exposed faces the medium during printing, and the transmissive section being further configured such that the region of the medium corresponding to the printing range is transmitted through the transmissive section when the surface of the casing where the printing head is exposed faces the medium.

2. The printing system according to claim 1, wherein the control section creates the imaging image by carrying out at least one imaging process of enlargement, reduction, rotation, and inversion with regard to the image.

3. The printing system according to claim 2, wherein the control section divides the imaging image into a plurality of regions, moves a printing location where the printing section prints corresponding to the regions, and causes the printing section to perform printing to each region in a case of printing the imaging image which is wider than a printable region of the printing section.

4. The printing system according to claim 3, wherein a printing section is provided with a printing head and a sub tank which supplies ink to the printing head, and the printing head reciprocates in a main scanning direction while discharging ink droplets onto an opposing medium and moves in a sub-scanning direction which intersects with the main scanning direction.

5. The printing system according to claim 4, wherein an image reading section, which reads an opposing image by moving an image sensor along the main scanning direction in the sub-scanning direction, is provided so as to be able to be attached and detached.

6. The printing system according to claim 1, wherein the printing apparatus further includes a display section configured to display the image, the designating section is further configured to designate printing with regard to the image which is displayed on the display section, the display section serves as the transmissive section which is a transmissive touch panel in which a display surface of the display section is transmissive, and determination of the printing range is possible by touching the display surface of the display section, and the control section creates the imaging image of the image in the printing range based on determination using the display section after the designation from the designating section.

* * * * *